United States Patent
Brown

(10) Patent No.: US 9,610,495 B2
(45) Date of Patent: Apr. 4, 2017

(54) METHOD AND APPARATUS TO ELICIT MARKET RESEARCH USING GAME PLAY

(71) Applicant: Upfront Analytics Ltd., Dublin (IE)

(72) Inventor: Amber Raschel Aurora Brown, Wicklow (IE)

(73) Assignee: Upfront Analytics Inc., Dublin (IE)

( * ) Notice: Subject to any disclaimer, the term of this patent is extended or adjusted under 35 U.S.C. 154(b) by 91 days.

(21) Appl. No.: 14/250,560

(22) Filed: Apr. 11, 2014

(65) Prior Publication Data
US 2014/0315635 A1 Oct. 23, 2014

Related U.S. Application Data

(60) Provisional application No. 61/814,154, filed on Apr. 19, 2013.

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/30 | (2014.01) |
| A63F 13/46 | (2014.01) |
| G06Q 30/02 | (2012.01) |

(52) U.S. Cl.
CPC .............. *A63F 13/12* (2013.01); *A63F 13/30* (2014.09); *A63F 13/46* (2014.09); *G06Q 30/0201* (2013.01); *G06Q 30/0203* (2013.01)

(58) Field of Classification Search
CPC ..... A63F 3/0421; A63F 3/0423; A63F 9/0098
See application file for complete search history.

(56) References Cited

U.S. PATENT DOCUMENTS

| | | | | |
|---|---|---|---|---|
| 2007/0018393 | A1* | 1/2007 | Ritter | A63F 9/183 273/272 |
| 2007/0077993 | A1* | 4/2007 | Midgley | A63F 13/12 463/42 |
| 2009/0091087 | A1* | 4/2009 | Wasmund | A63F 9/18 273/430 |

OTHER PUBLICATIONS

Pictionary, 1993, https://en.wikipedia.org/wiki/Pictionary and attached game rules.*

* cited by examiner

*Primary Examiner* — Kevin Y Kim
(74) *Attorney, Agent, or Firm* — Davis Wright Tremaine LLP; Philip H. Albert

(57) ABSTRACT

A system and method are described for a computer-based picture association game that can be used to elicit market research data, specifically sentiment and awareness data, from consumers. In a first game mode, each player is given an image and a list of phrases, and tasked with selecting the phrase that best describes the image. Then in a second mode, players are presented with a collection of images, including images assigned to players in the first game mode. They are also shown the phrases selected in the first game mode. Each player then has a limited amount of time to both associate these phrases with the corresponding images, and to assist other players in associating his own image. Points are allocated for correct associations. The phrases selected by players and the guesses players make can be analyzed to reveal opinions and knowledge that players have about products, brands, and people.

18 Claims, 23 Drawing Sheets

METHOD AND APPARATUS TO ELICIT MARKET RESEARCH USING GAME PLAY

CROSS-REFERENCE TO RELATED APPLICATION

This application claims priority to U.S. Provisional Patent Application Ser. No. 61/814,154, filed Apr. 19, 2013, entitled "Stamp Games," which is hereby incorporated herein by reference for all purposes.

BACKGROUND

Embodiments relate to a picture association computer game designed to entertain as well as elicit market research or business intelligence data.

Modernly, data surveys are used to elicit consumer data. Such surveys are designed as data collection tools to assess peoples thoughts, feelings, and opinions. For example, stores and hotels often use surveys to check on the customer's experience with staff, airlines use surveys to get data on the passenger's travel experience, and physicians, psychologists, and sociologists often use surveys to help diagnose medical conditions. While surveys work to some limited degree, the questioning used by surveys are usually stated in a non-context manner, which often causes the subject to ask questions like "Why am I being asked this?" and "What do they want me to say?" Such questioning also may cause a user to answer questions using random answers just to get to the end of the survey as quickly as possible.

Computer games have come into popularity as data mining tools. Since games are inherently designed for entertainment, the bulk of the data mining surrounds the data corresponding to the game itself. For example, the number of mouse clicks may be counted, as well as the users' interaction with the game can tell the computer game manufacturer how well the game is being received. In order to gather such data, the computer game industry uses metrics such as daily active users (DAU), Monthly Active Users (MAU), Engagement, and K-Factor, which denotes the infection rate of viral game growth.

Computer games are typically designed for a particular demographic. For example, computer games may be designed for teenage boys. The computer game manufacture will often surreptitiously examine the player profile data or surveys in order to determine the demographic makeup of the computer game players in order to assess whether the game was designed to appeal to a particular demographic. Such designs are often based on focus groups and surveys, which have been shown to be ineffective.

Therefore, what is needed is a computer game method designed to entertain and engage players, gather consumer data to assess thoughts and feelings and obtain useful demographic data, while protecting the privacy of the computer game players.

BRIEF SUMMARY

Embodiments include a picture association game that both entertains and elicits market research or business intelligence data. In one embodiment a system is used to present a first image and a first set of phrases associated with the first image to a player. In response to the presentation, the player makes an association by selecting a first phrase from one of the phrases to match to the first image. The first image has content that is associated with a product or service being studied for consumer sentiment that relates to the set of first phrases. The system then presents a set of images to the player and also separately presents a second set of phrases to the player. The set of images includes at least a second image that also includes content related to a product or service that has been associated by another player to a second phrase selected from the second set of phrases by the second player. The second phrase is displayed separately to the first player. The first player attempts to find the second image from the second set of images to match to the second phrase. Similarly, the second player attempts to find a matching phrase from the first set of phrases that describes the first image. The first and second players are provided points each time they find a correct match. The cumulative point values of the players along with the phrases are analyzed to determine a consumer sentiment with regard to products or services associated with the first image and the second image.

DETAILED DESCRIPTION

Embodiments include a picture association game that both entertains and elicits market research or business intelligence data. The picture association game is designed for a plurality of players, with no set maximum. In an embodiment, each player is presented with a query image and a list of phrases. A phrase consists of one or more words that collectively have meaning. He or she is asked to choose a phrase from the list of phrases to associate with the query image (called a "stamp") based on a given criterion or criteria (e.g. "Pick the phrase that best describes your stamp"). Players are then directed to a game interface containing the associated phrases chosen by other players as well as a set of images that include both the other players' query images and a collection of distractor images. Distractor images as described herein are used to "distract" the player so as to require concentration for proper game play. Each player is then given a limited amount of time, indicated by a countdown timer, to guess the images that have been associated with the phrases chosen by the other players. The first player to both correctly associate the image choices of others and have his own image choice correctly associated wins. Should no player succeed in doing so, the winner is decided by other means. For example, a player with the highest number of correct associations once the countdown timer reaches zero could be named as winner.

High-quality games are inherently engaging over long periods of time, as dedicated players play their favorite games again and again. Mobile games are played by all demographics. And game play may tap into instinctual, revealed preferences that are less susceptible than survey data to contextual issues and demand characteristics ("Why am I being asked this?" "What do they want me to say?" "How do I finish this task as quickly as possible?"). So by structuring games appropriately for market research purposes, ambiguity and uncertainty in topic and polarity classification can be avoided; by tapping into the broad demographics that play casual mobile games, representative sampling can be performed; and by weaving data collection into engaging game play, revealed sentiment can be measured while avoiding the extremes that occur in unprompted expression. For these and other reasons, data mining of specialized mobile games is an exciting new approach to gathering market research.

Figure 1A:
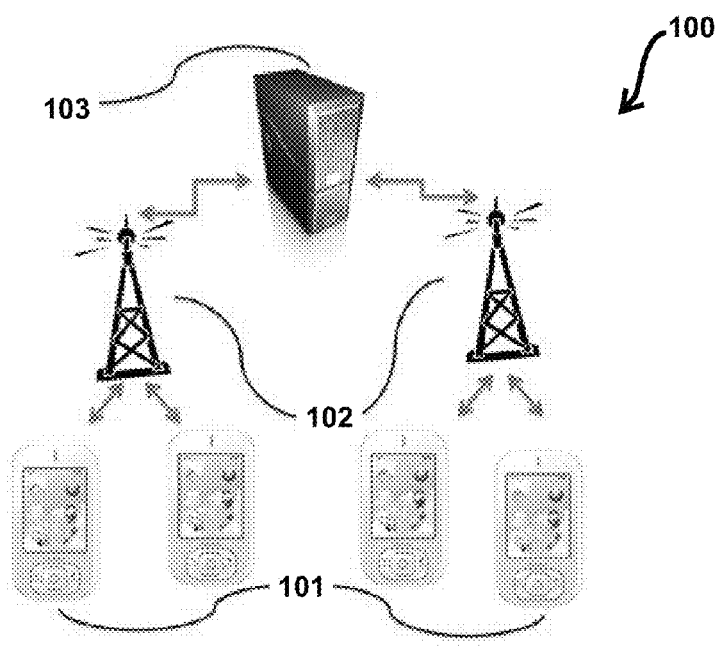
FIG. 1(a) illustrates mobile devices connected via a communications network in accordance with at least one embodiment.
Figure 1B:
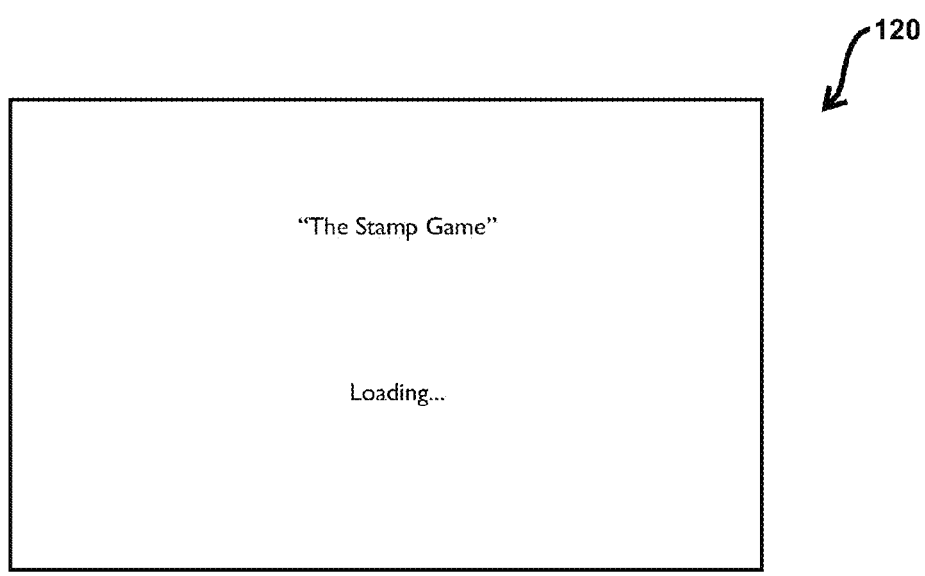
FIG. 1(b) illustrates an initial loading screen in accordance with at least one embodiment.
Figure 1C:
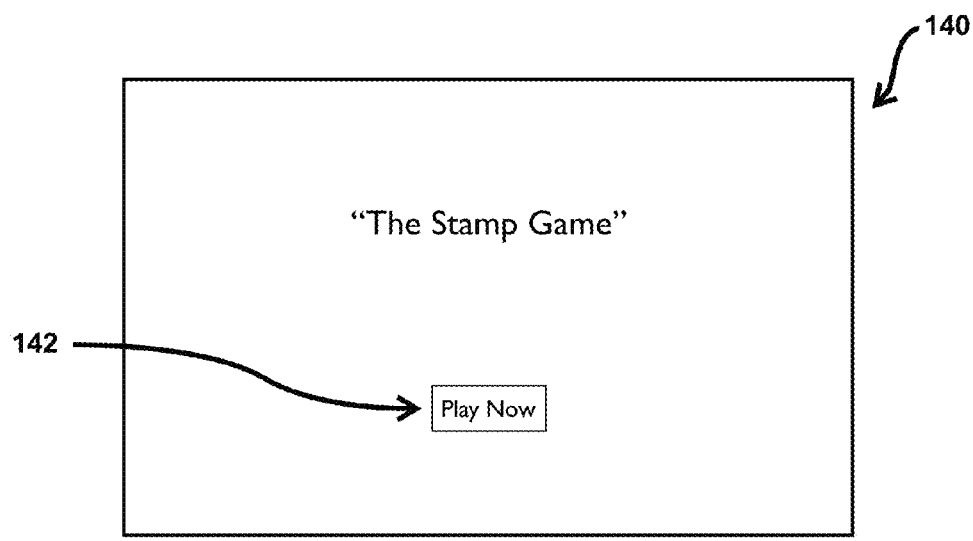
FIG. 1(c) illustrates an initial menu screen in accordance with at least one embodiment.
Figure 2:
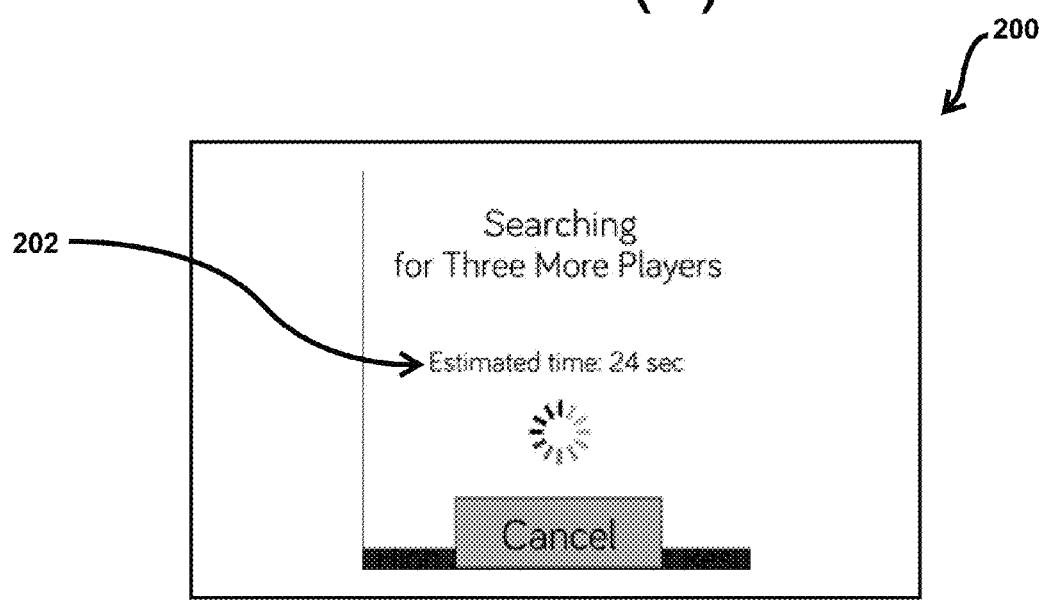
FIG. 2 illustrates an interface while waiting for an additional three players in accordance with at least one embodiment.
Figure 3:
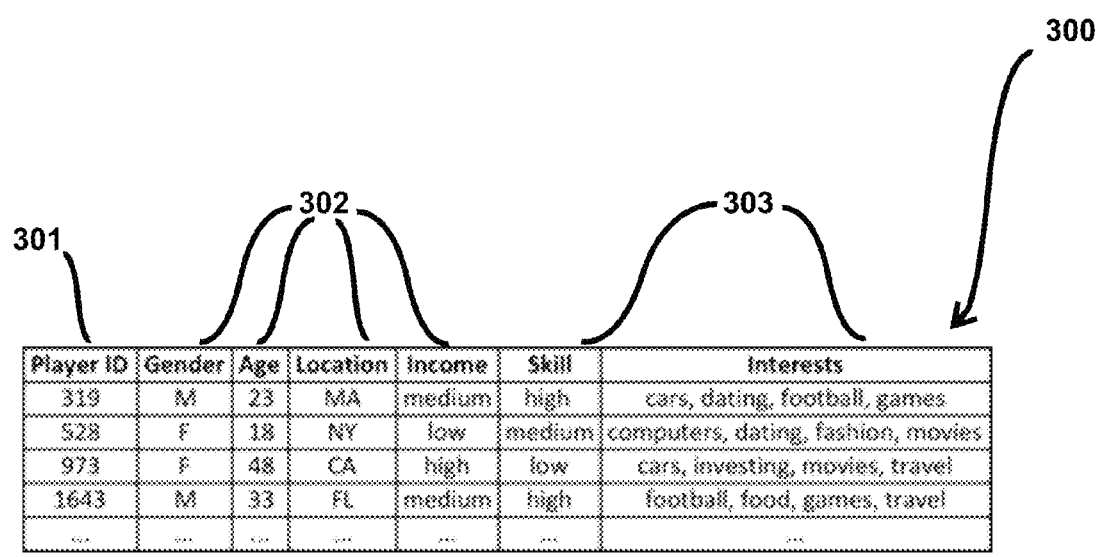
FIG. 3 illustrates the contents of an example player database in accordance with at least one embodiment.
Figure 4:
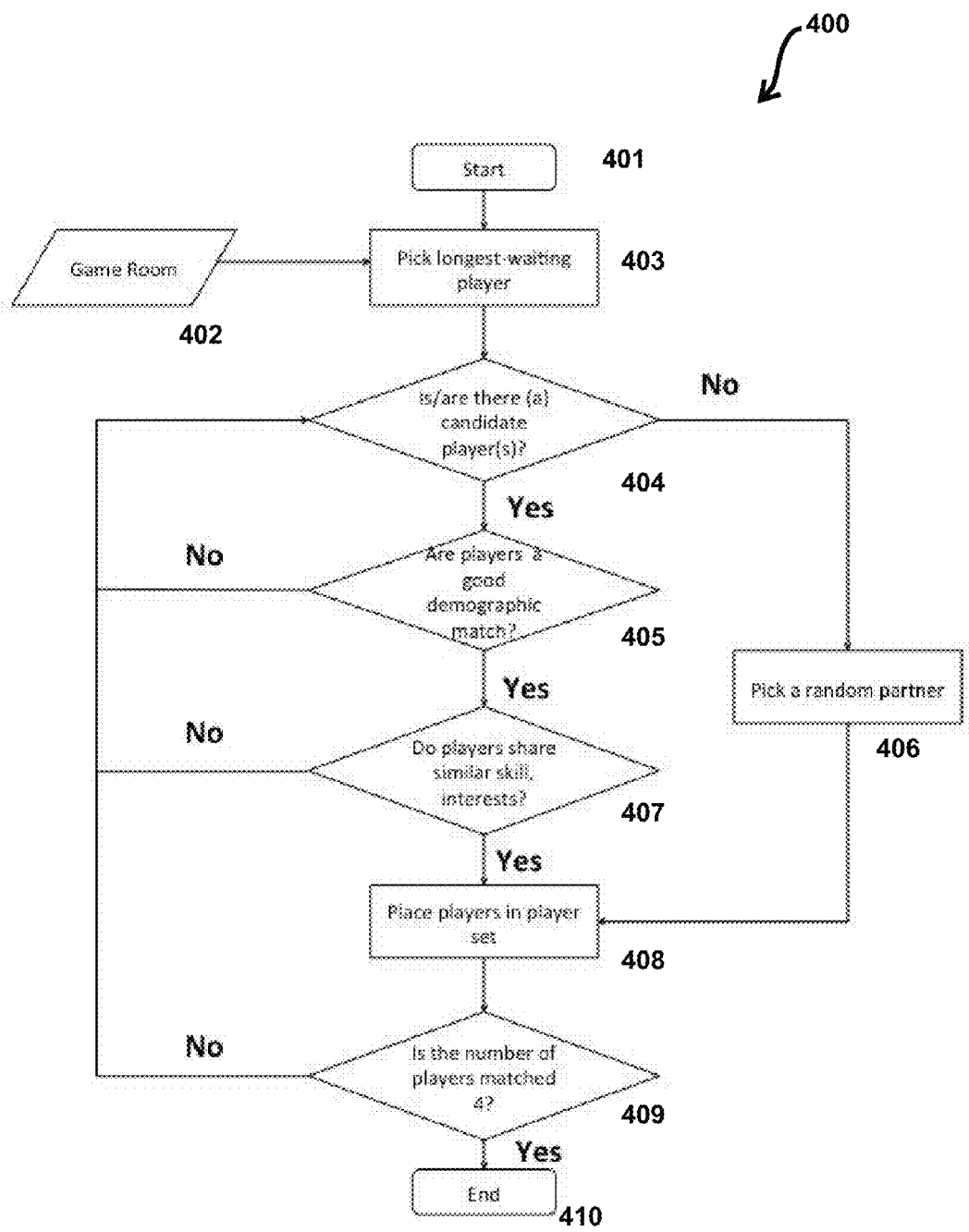
FIG. 4 illustrates an example process for matching game players that can be used in accordance with at least one embodiment.

To this end, the inventors have invented "The Stamp Game", a multi-player picture-association game which may be played on virtually any computing device, including mobile devices likes smartphones and tablets. In one embodiment the game is played by two people, but in other embodiments three or more can play. In the four-player embodiment shown in FIG. 1(a), the system 100 comprises client devices 101 that are connected via a communications network 102 to a game server running on a computer 103. The client devices 101 can be virtually any kind of computer such as a desktop, laptop, smartphone, tablet, wearable computer, and the like. The communications network 102 can be virtually any kind of computer network such as a packet-switched network, a local area network, a cellular phone network, and the like. The computer 103 can be virtually any type of computing device such as a cloud computer, mainframe, (Graphics Processing Unit) GPU-based processor, and the like. In one embodiment, a game consists of a single round of play divided into two sequential game modes, one played after the other. When a player activates the "The Stamp Game" application on his mobile device, the loading screen 120 in FIG. 1(b) is presented to him. Following this, the menu screen 140 of FIG. 1(c) appears. From there the player can choose via a screen button 142 to play the game. At this point in one example embodiment, the player is informed via screen 200 in FIG. 2 that the game server is searching for three other players who are also waiting to play the game and is given an estimated waiting time 202. The game server considers the data in the player database 300, shown in FIG. 3, when potentially matching players. While the data in the database as shown in one example consists of player IDs 301, demographic data 302, and data about players' playing skill and interests 303, other data is contemplated. In one embodiment the matching algorithm 400 is shown in FIG. 4. The players waiting to play are stored in the game room 402. In the first loop through step 403 the player who has been waiting the longest is picked as the initial player. Step 404 of the matching algorithm 400 checks if there is a candidate player who is also in the game room and who has not yet been considered for the player set. If all the players have been considered and none is an ideal match, then the next player is picked randomly 406 and added to the player set 408. If a candidate partner is identified at step 404, then the matching algorithm 400 tests that player for demographic compatibility with players already in the player set 405. For example, two players may be considered as demographically compatible if they had similar values for their demographic attributes 302 in the player database. If a candidate partner is still in consideration after step 405, then that player is tested for skill level and interest compatibility with other players 407. For example, two players may be considered as being compatible if they had similar values for their skill level and interest attributes 303 in the player database. In this embodiment, if a candidate partner passes both steps 405 and 407 then she is added to the player set 408. This process is then repeated until all four players have been found 409. If four players have been found, the matching algorithm 400 ends at 410. If four player have not been found, the matching algorithm 400 returns to 404.

Figure 5:
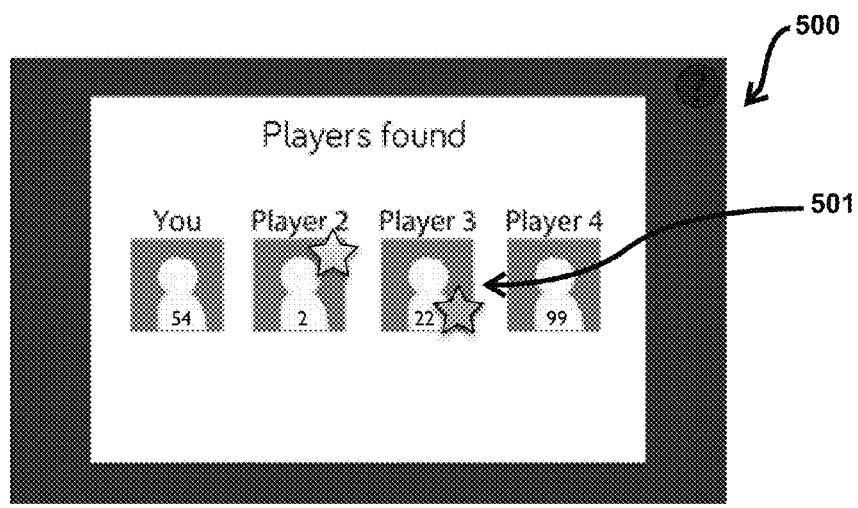
FIG. 5 illustrates an example interface wherein three other players have been found, the four players have been paired, and the game will begin shortly.
Figure 6A:
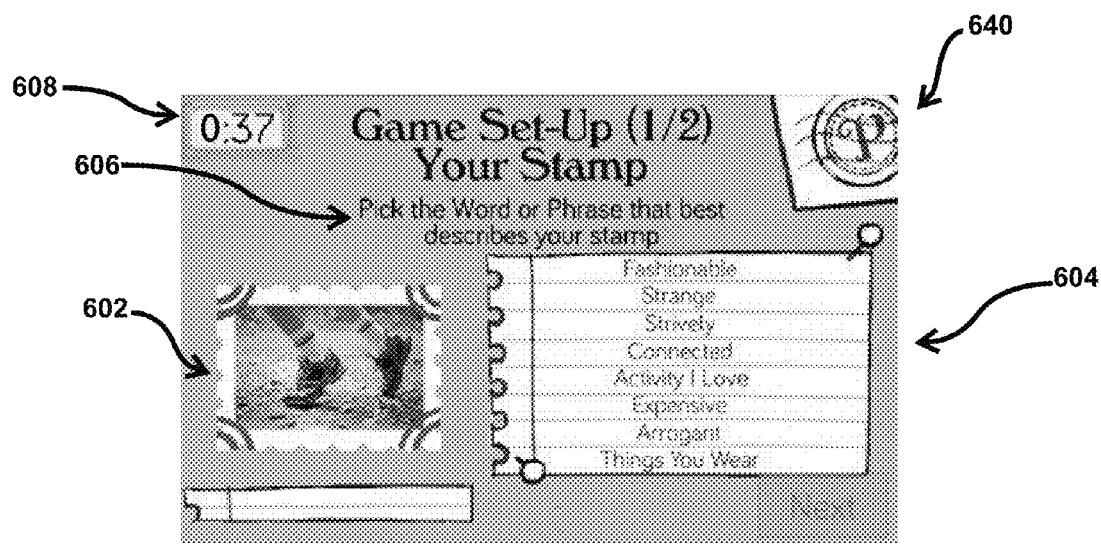
FIG. 6(a) illustrates an example interface for game mode one wherein a player chooses a phrase from a list of phrases to associate with an image, hereafter known as a "stamp"
Figure 6B:
FIG. 6(b) illustrates an enlarged version of the stamp image shown in FIG. 6(a)
Figure 6C:
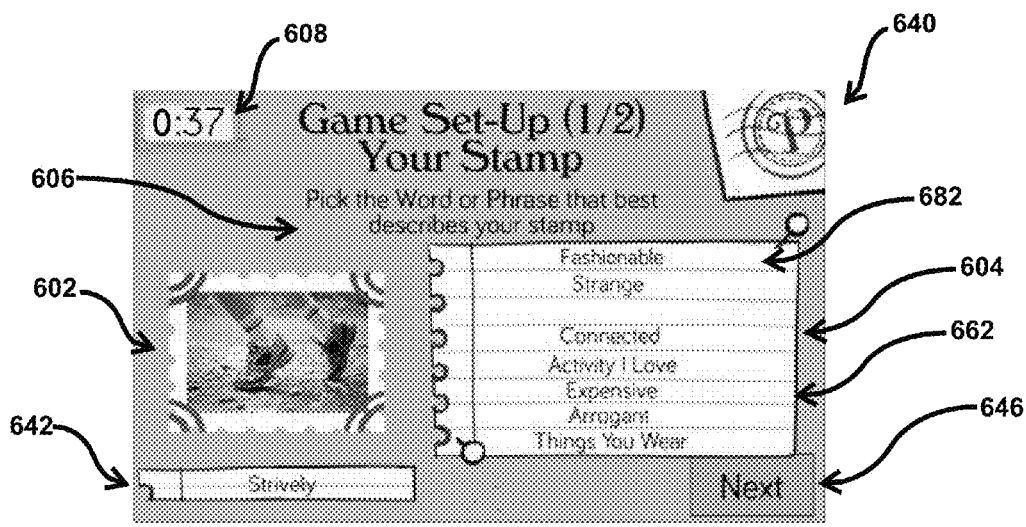
FIGS. 6(c-e) illustrates screen shots of an example interface for game mode one wherein a player chooses a descriptor phrase from a list of descriptor phrases to associate with his stamp image.
Figure 6D:
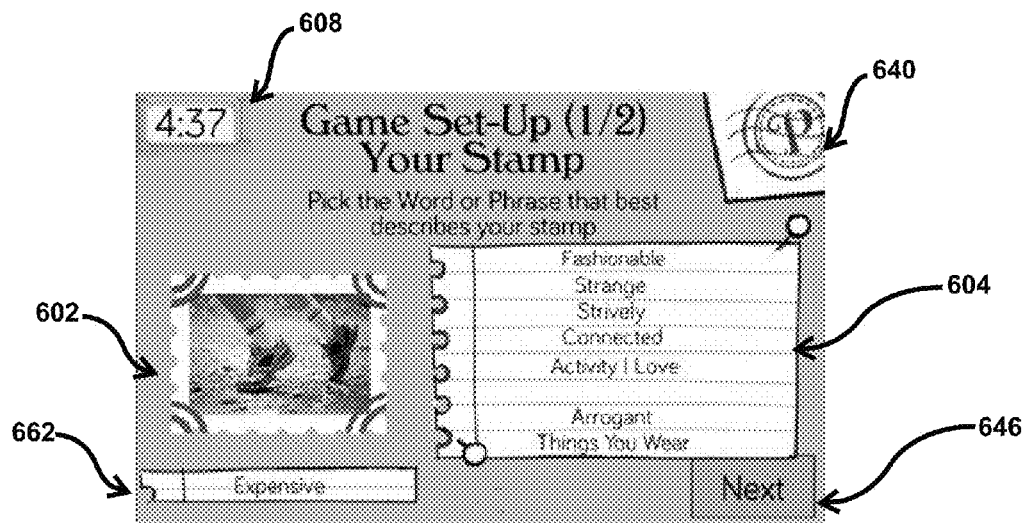
Figure 6E:
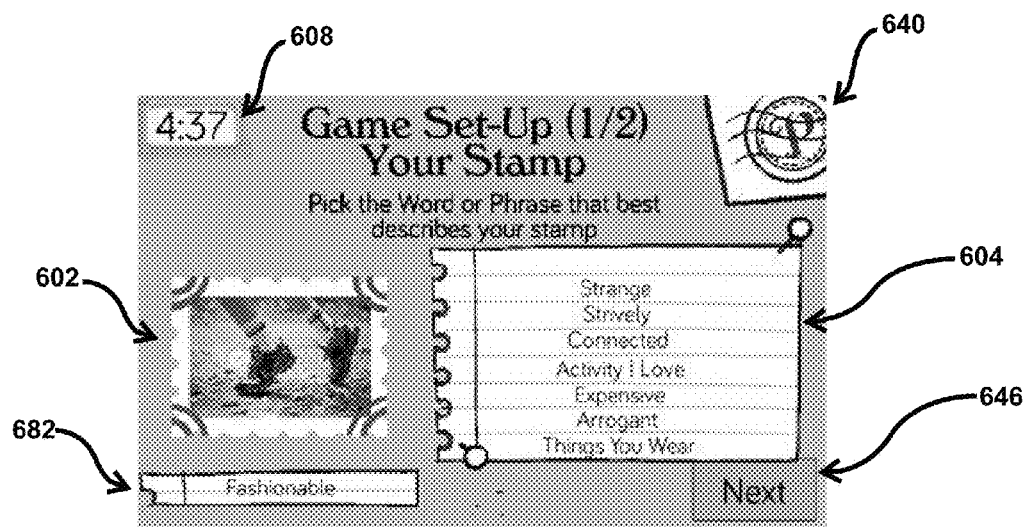

Once all players have been matched, they are informed via the screen display 500 in FIG. 5 that a complete group of players has been found and the game is about to commence. The skill level, interests 303, and past game-related achievements of the other players are depicted by the avatar and badge images 501, so that each player has some knowledge about the skill level and interests of the players with whom he has been matched. Game mode one, the first of two sequential game modes in one embodiment, then begins. In game mode one each player is shown a unique image, hereafter known as the player's "stamp" 602. In game mode one each player is also shown a unique list of phrases, hereafter called "descriptors" 604. In one embodiment, most of the descriptor phrases are sentiment-oriented words ("fashionable", "strange", "expensive", "arrogant", etc.) so as to encourage the players to provide sentiment associations over factual and obvious associations through their choice of descriptors. Each player is asked from instruction 606 to pick the descriptor that best describes his stamp image 602 shown in FIG. 6(*a*), and may touch or click on the image to see a larger version, as shown in screen 620 of FIG. 6(*b*). Each player can scroll over his list of descriptor phrases 604 and then make his choice by touching or clicking one of the descriptor phrases 604. In FIG. 6(*c*), a player's screen shows his stamp image 602 with the caption "Strively" 642, a descriptor phrase that the player has chosen from the selection of descriptors from the descriptor phases 604 to associate with his stamp image 602. In FIG. 6(*d*), the player's screen 640 shows his stamp image 602 with an alternative selection of descriptor phrase, "Expensive" 662. In FIG. 6(*e*), the player's screen 640 shows his stamp image 602 with yet another alternative selection of descriptor phrase in descriptor phases 604, "Fashionable" 682. The countdown clock 608 indicates the amount of time a player has to choose the descriptor. If a player does not choose one of the descriptor phases 604 before the clock 608 counts down to zero, a random descriptor from descriptor phases 604 will be associated with his stamp image 602.

Figure 7:
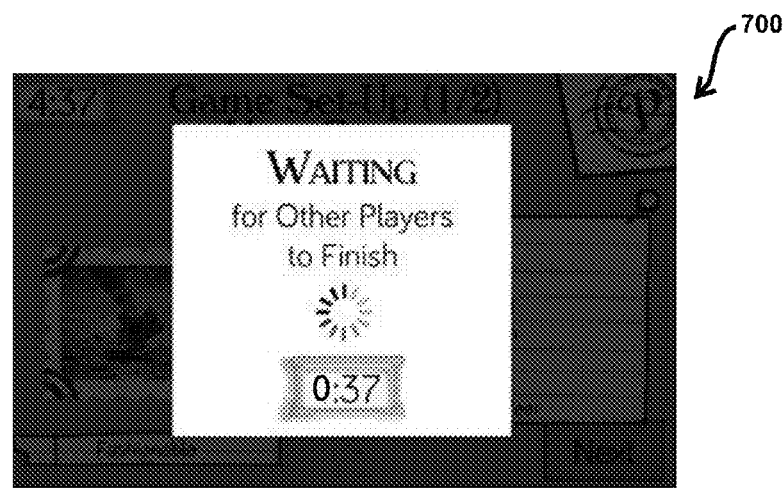
FIG. 7 illustrates an example interface shown while waiting for other players to complete a game task.
Figure 8A:
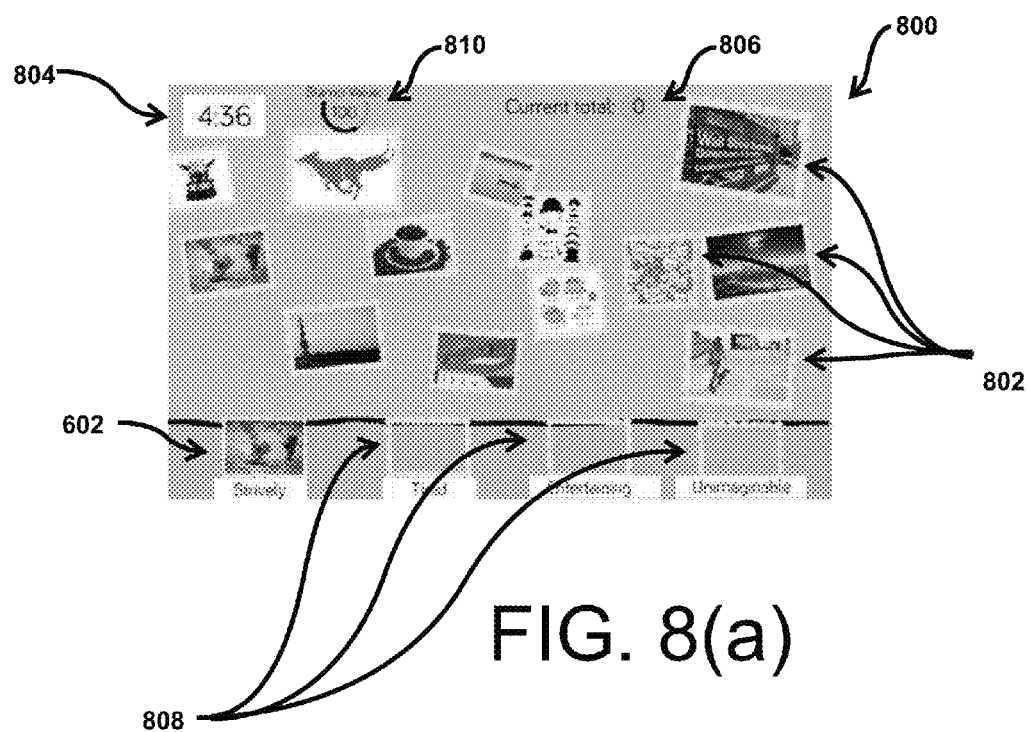
FIGS. 8(a-d) illustrates an example interface for game mode two.
Figure 8B:
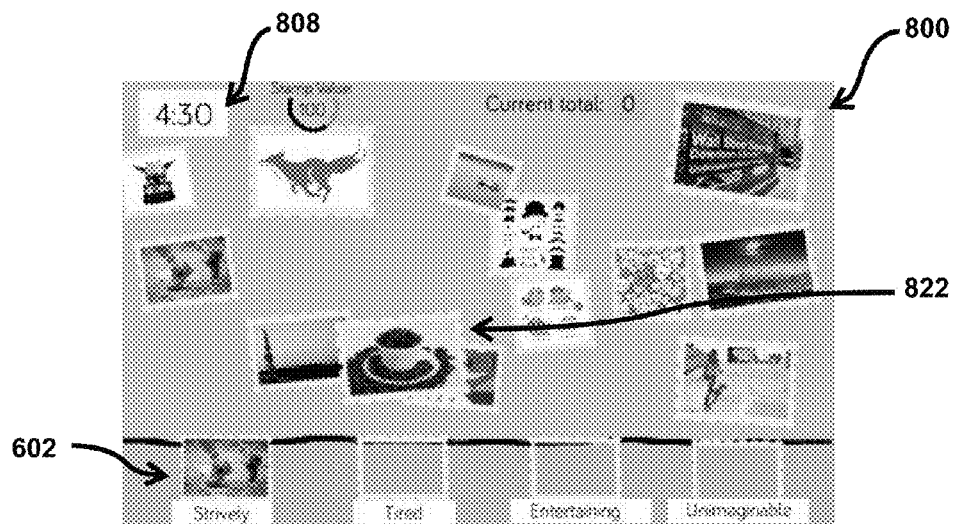
Figure 8C:
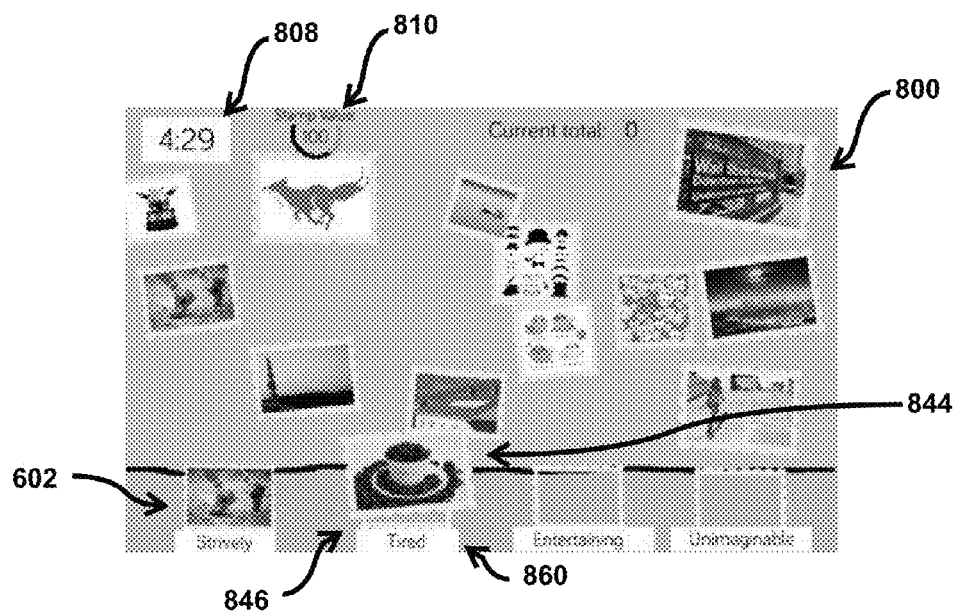
Figure 8D:
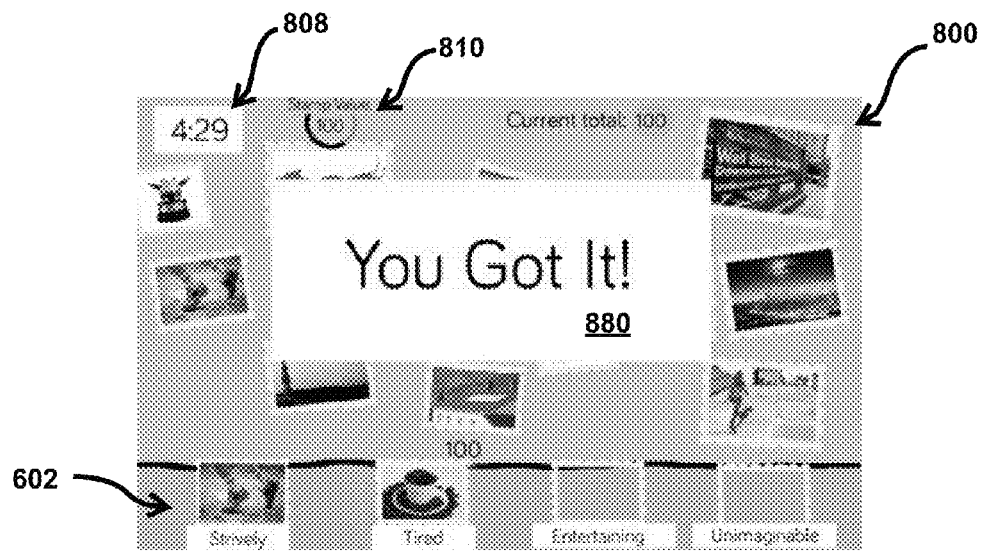

When a player is finished assigning a descriptor to his stamp image 602, he touches or clicks the "next" button 646 to be brought to the waiting screen 700 in FIG. 7, which is displayed to each player until all players have completed game mode one. Game mode two begins when every player has completed the descriptor selection task in game mode one. Example field of play screen 800 of FIG. 8(*a*) is composed of a variety of images (again called stamps) 802, a countdown clock 804, a running points total 806, and a number of blank stamps 808 with captions (in this embodiment, three blank stamps are shown). In this embodiment, a large number of "distractor" images 802 that have not been chosen by players in game mode one are randomly selected from a database of images and placed on the field of play 800. Sometimes not all images on the field of play will be visible, meaning players will have to pan from one end of the screen to the other using touch or button controls to access them. These additional distractor images increase the challenge for game mode two by making it hard for the players to find the stamp images needed to complete game mode two. Each caption on the blank stamps 808 is a descriptor, such as descriptor 642, "Strively", that has already been associated with one of the images by another player in the game mode one. Players are given a set amount of time, indicated by the countdown clock 808, to correctly associate images with descriptor phrase by dragging and dropping the stamp image they think has been associated with a given descriptor by another player on to the blank stamp associated with that descriptor. FIGS. 8(*b-d*) illustrates an example interface for game mode two wherein a player is dragging 822 and dropping 844 the highlighted image onto the space associated with the phrase "Tired" 846, resulting in a completed association between the stamp image and the descriptor phrase "Tired" 860.

Figure 9A:
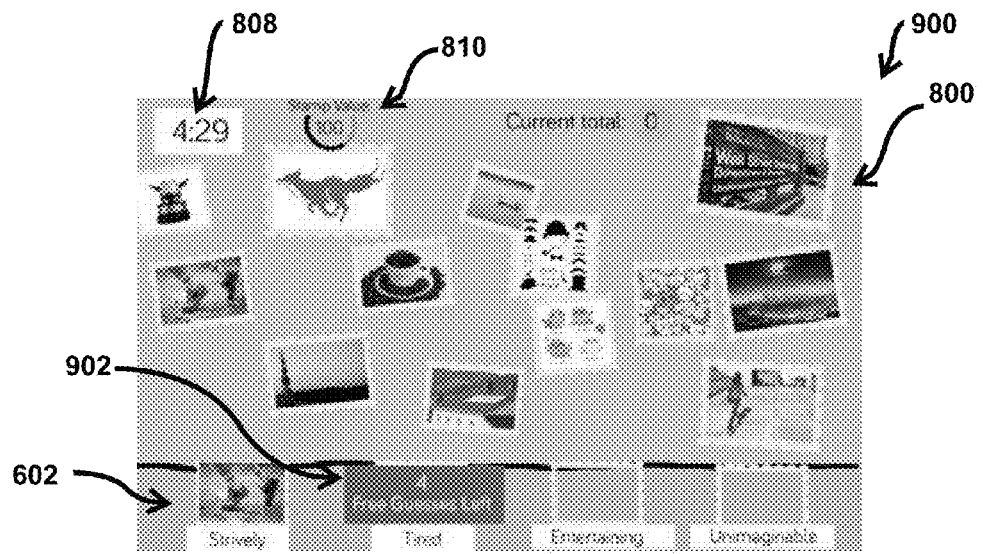
FIG. 9(a) illustrates an example screen for game mode two that is shown when a player has incorrectly guessed the stamp image with which a given descriptor has been associated.
Figure 9B:
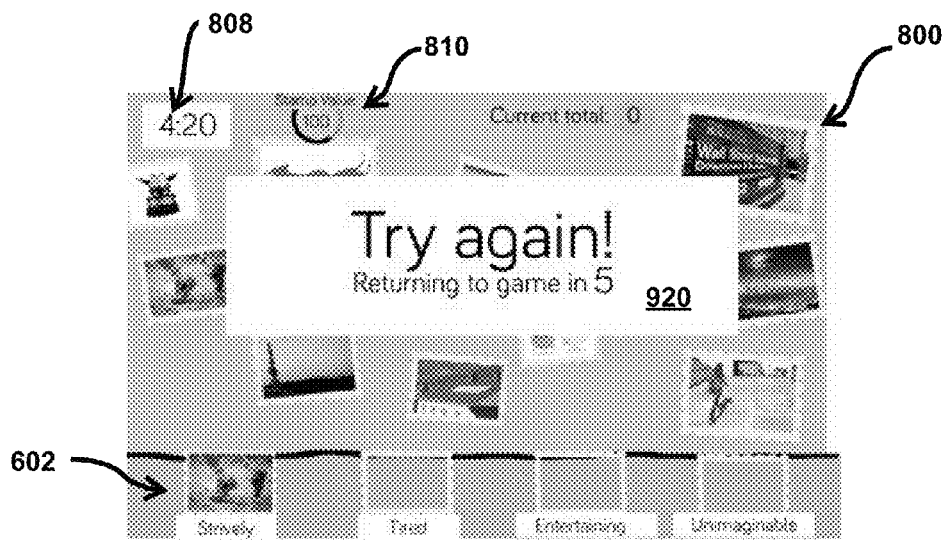
FIG. 9(b) illustrates an example screen for game mode two shown when a player has been temporarily locked out of a game instance as a result of guessing incorrectly a given amount of times.

Should a player succeed in making a correct association, he is allocated points equal to the image's current stamp value 810, which deteriorates as time progresses, and presented with the example screen 880 shown in FIG. 8(*d*). In this embodiment, a player is allowed to guess up to five times without incurring a penalty. For each incorrect guess the player is warned that he has only a certain number of his free guesses remaining. In the example shown FIG. 9(*a*) the player has been informed that he has four guesses remaining 902 before a penalty is incurred. If these guesses are exhausted, the player is temporarily locked out of the game 920, as in FIG. 9(*b*).

Figure 10:
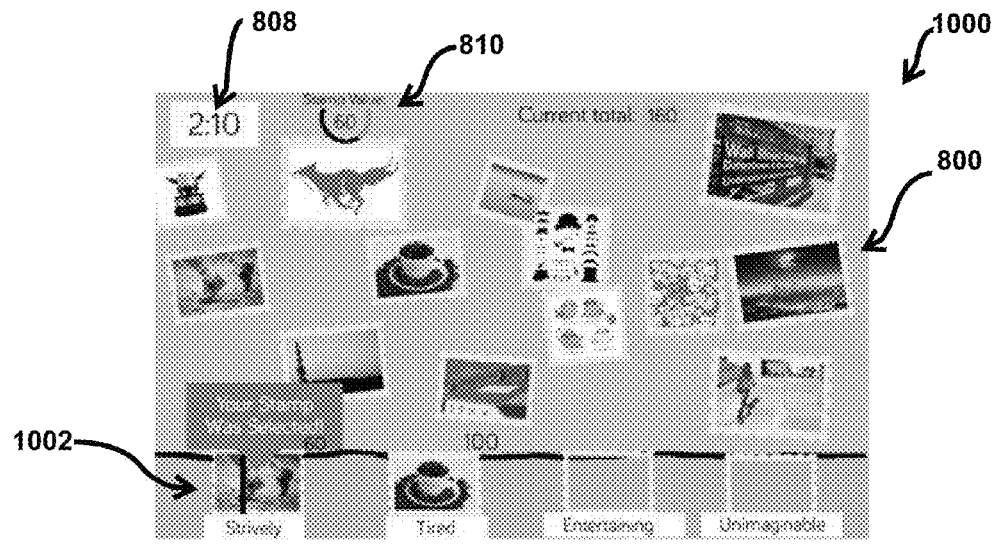
FIG. 10 illustrates an example interface for game mode two wherein the player's assigned stamp image appears segmented as a result of another player correctly associating it with the descriptor "Strively"
Figure 11A:
FIG. 11(a) illustrates an example screen for game mode two that is shown when a player who has correctly associated all other players' images with their descriptor phrases is prompted to aid the players who have not yet correctly associated his own stamp image and descriptor phrase.
Figure 11B:
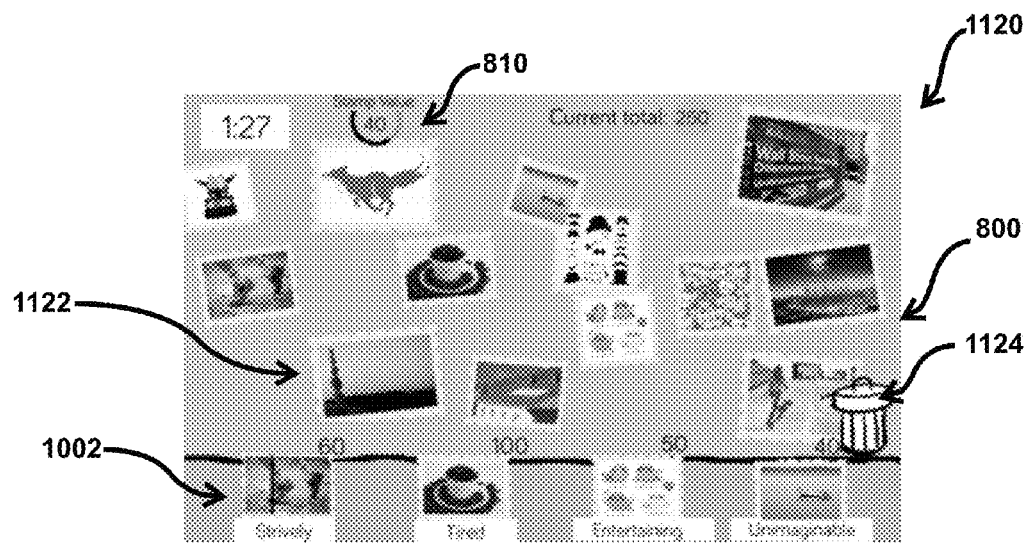
FIGS. 11(b-c) illustrates an example interface for game mode two wherein a player can drag and drop stamp images on to the garbage bin icon to remove them from play.
FIG. 11(d) illustrates an example screen for game mode two wherein all other players have correctly guessed his stamp image.
Figure 11C:
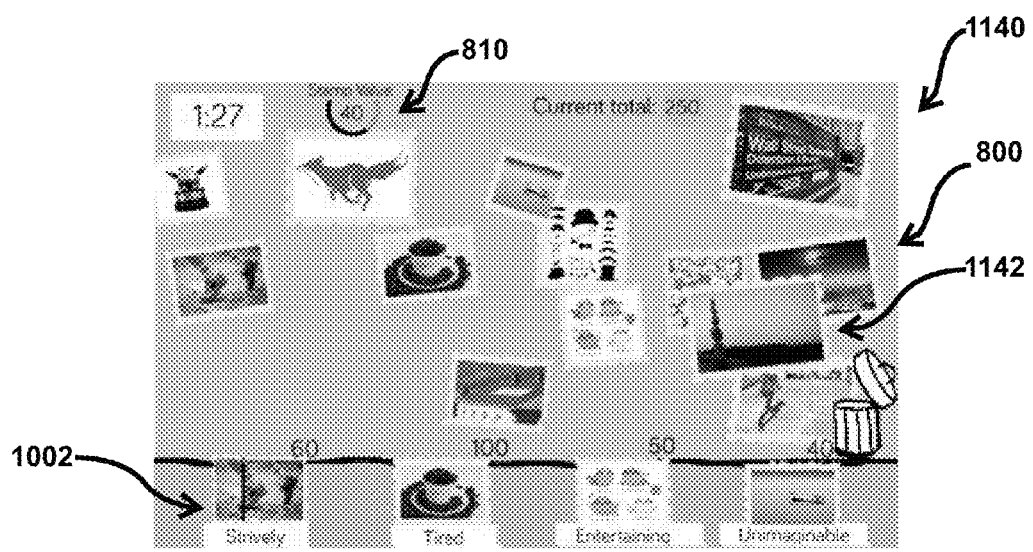
Figure 11D:
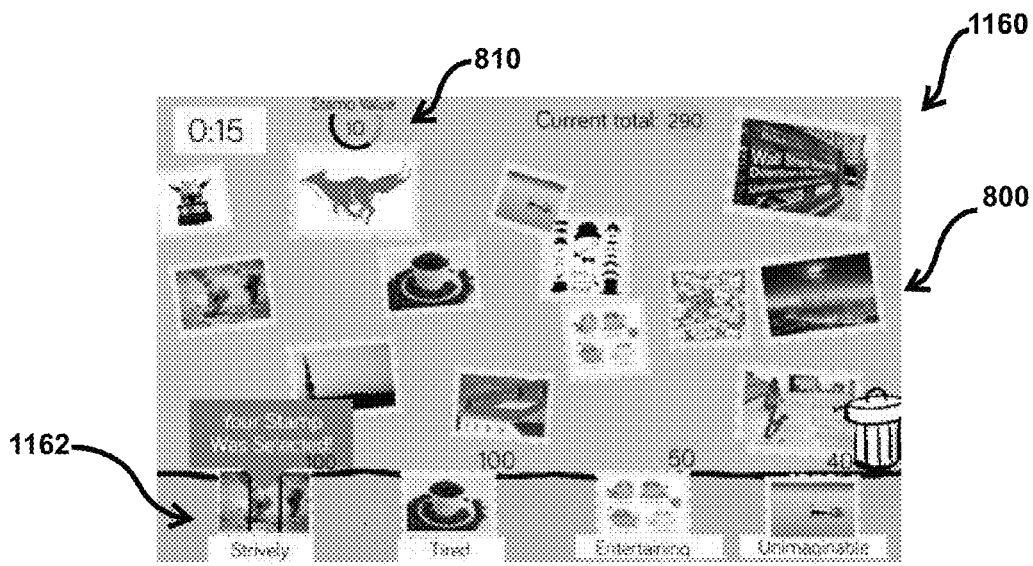

When one or more players have correctly associated a given player's stamp with its descriptor-phrase caption, it will appear segmented to him. Screen 1000 of FIG. 10 presents such a segmented stamp 1002 as a result of another player correctly associating it with the descriptor phrase "Strively". The normally colored segment comprises about one-third of the image, indicating that one player has correctly associated the player's stamp image with "Strively", while the more muted coloring of the segment, which makes up the remaining two-thirds of the stamp image indicates that two players have yet to guess it correctly.

In some embodiments, a player who has correctly associated all other players' stamps and descriptor phrases and not yet had every player associate his stamp image 602 and phrase may be permitted to aid them in their search. FIGS. 11(*a*) to 11(*d*) show an example of a game mechanic that would allow this. Screen 1100 of FIG. 11(*a*) informs a player that as he has correctly associated the other players' images with their descriptor-phrase captions, he is now tasked with helping them associate his image stamp 602 with his descriptor phrase. In FIGS. 11(*b*)-11(*c*) he then drags and drops image 1122 that could also be plausibly be associated with the descriptor "Strively" into a garbage can 1124, thereby removing it from the collection of "stamps". To ensure that other players actually select it, the player is not permitted to discard his own image stamp 602.

Figure 12:
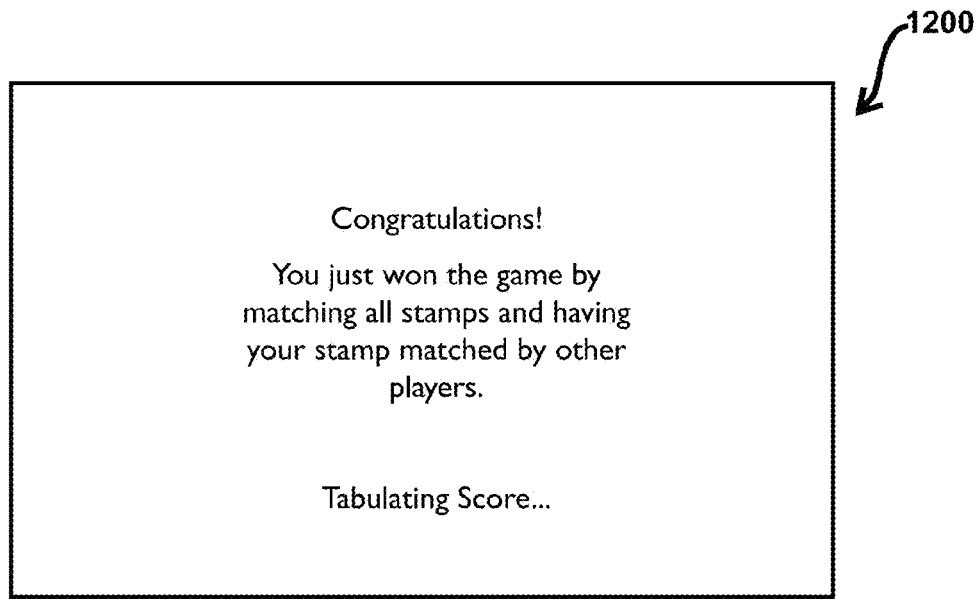
FIG. 12 illustrates an example screen for game mode two wherein the player has won the game.
Figure 13A:
FIG. 13(a) illustrates an example screen for game mode two wherein players are informed that a player has associated all the stamp images with the appropriate descriptors and the game is over.
Figure 13B:
FIG. 13(b) illustrates an example screen for game mode two wherein players are informed that the game's countdown clock has reached zero and the game is over.

Should every player succeed in finding the correct image for a player's descriptor, it is highlighted on the player's screen as a fully segmented stamp image 1162 (FIG. 11(*d*)) and he is presented with screen 1200 of FIG. 12 which informs him that he has won the game because he has associated every other player's image with its proper descriptor phrase and had his own stamp image associated with the correct descriptor phrase by every other player. The other players are also informed that the game has ended, with the winning player being identified as "Player 2," and that the score is being tabulated 1300 (FIG. 13(*a*)). The game can also end when the countdown reaches zero 1320 (FIG. 13(*b*)), regardless of whether any player has correctly found the associated phrases for all stamps.

Figure 14:
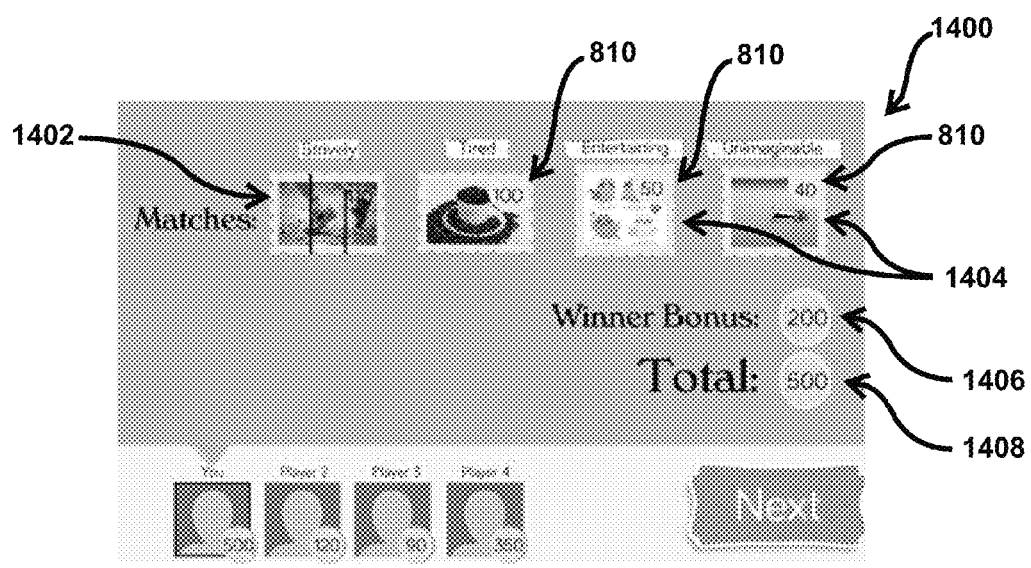
FIG. 14 illustrates an example results screen.

Screen 1400 of FIG. 14 shows an example scoring screen. Players are allocated points both when other players correctly associate their image 1402 with the correct descriptor phrase and when they succeed in associating the images of others 1404 with the correct descriptor phrases. The exact number of points won is dependent on the image's stamp value 810. The winner is also given an additional winner's bonus 1406. These, when summed, yield a player's total score 1408.

Figure 15:
FIG. 15 illustrates an example leaderboard screen.

Some embodiments may include leaderboards. Screen 1500 of FIG. 15 shows an example leaderboard outlining the five players with the highest point totals of recent games. "Player 2", who scored 5510 points in a game played on November 10, is leading; he or she is followed by "talldude", with a score of 4900 points on October 16, "keyboard", who scored 4450 points on November 12, "cutegirl", with 4500 points on November 19, and "Angelina", with a score of 1000 points on December 12.

Figure 16:
FIG. 16 illustrates two example word clouds showing the relative frequency with which sentiment-oriented words were chosen for different images of products.
Figure 16:
Figure 17:
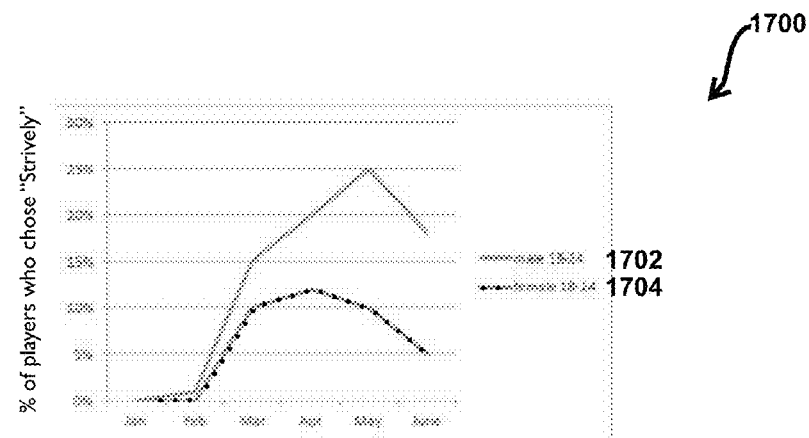
FIG. 17 is a plot illustrating awareness of a marketing initiative over time by consumers in different demographic segments.
Figure 18A:
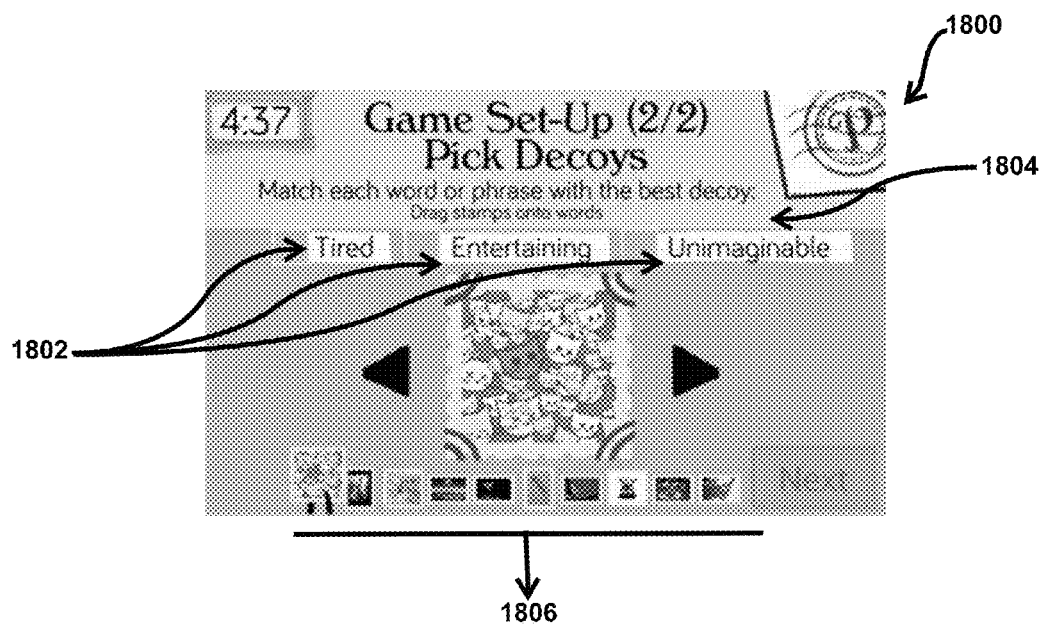
FIG. 18(a) illustrates an example interface for game mode one wherein a player is given a number of descriptors chosen by other players to associate with their stamp images and asked to choose a decoy image to associate with them in accordance with at least one embodiment.
Figure 18B:
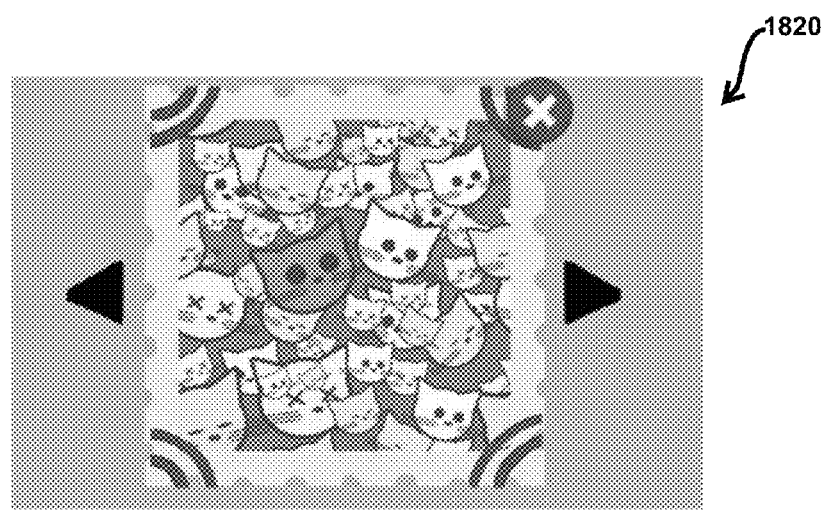
FIG. 18(b) illustrates an enlarged version of the image shown in FIG. 18(a)
Figure 18C:
FIG. 18(c) illustrates an example screen for game mode one wherein the player has chosen a decoy image to associate with the word "Tired" and is in the process of selecting another image from the collection of images at the bottom of the screen.
Figure 18D:
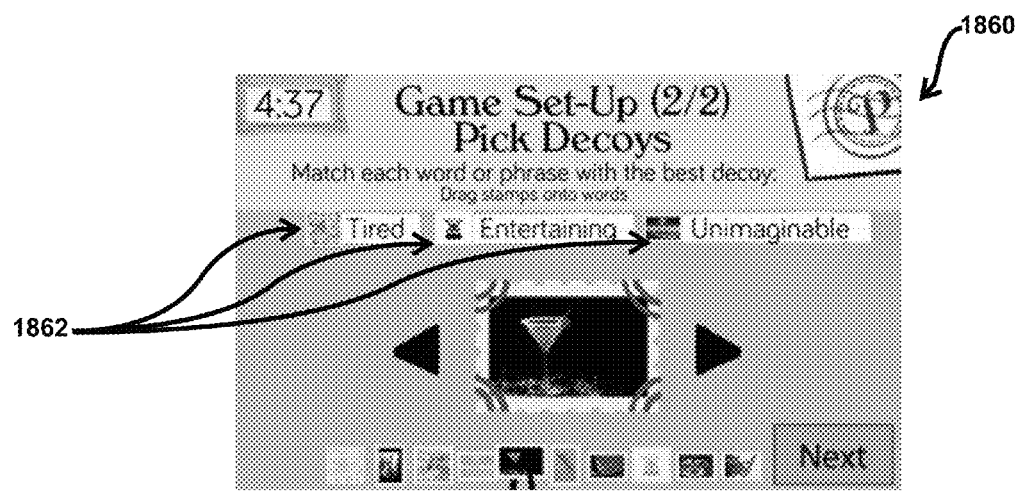
FIG. 18(d) illustrates an example screen for game mode one wherein the player has chosen the decoy images he wishes to associate with the phrases given.

As an example of how "The Stamp Game" may be used to generate market research data, the selected phrase "Strively" in the example scenario from FIGS. 6(*a*) and 8-11 shows an awareness of a recent product initiative of that name by the athletic shoes brand whose product is depicted in the image, Brand-N. Alternate selections would indicate a comment on the pricing of the brand's products based on descriptor 662 ("Expensive"), or some positive sentiment about the brand based on descriptor 682 ("Fashionable"). Market research data may be derived from such selections. For example, such selections may be weighted to take into account the time-dependent stamp value mechanic, which encourages players to make the first association that comes to mind. Lower stamp values generally indicate a lower awareness of or lower sentiment toward a brand; the inverse applies to higher stamp values. By integrating game-play data from thousands of highly engaged players over days, weeks, or months, we can discern significant patterns of awareness and sentiment. FIGS. 16 and 17 show hypothetical visualizations of such integrated data. FIG. 16 contains two word clouds 1600 that show the relative frequency with which sentiment-oriented descriptors were chosen for an image of a product by Brand-R on the left and an image of a product by Brand-P on the right. The word clouds show that Brand-R's shoes are perceived as colorful and fashionable, whereas Brand-P's shoes are perceived as cheap and retro. Finally, the chart 1700 in FIG. 17 shows the relative selection frequency of the word "Strively" for an image of Brand-N's new product by two demographic segments over a six-month period in which Brand-N began promoting the new product. This visualization tracks the degree to which the new product campaign has been noticed by males and females in the 18-24 age range. Graphs 1702 and 1704 show males were more receptive to the campaign than females, with both groups going from low initial name recognition to high recognition, and then to the beginning of a decline in recognition as the marketing campaign slackened.

Figure 19:
FIG. 19 illustrates an example screen for game mode two wherein the player is informed that another player has chosen his decoy image.
Figure 20:
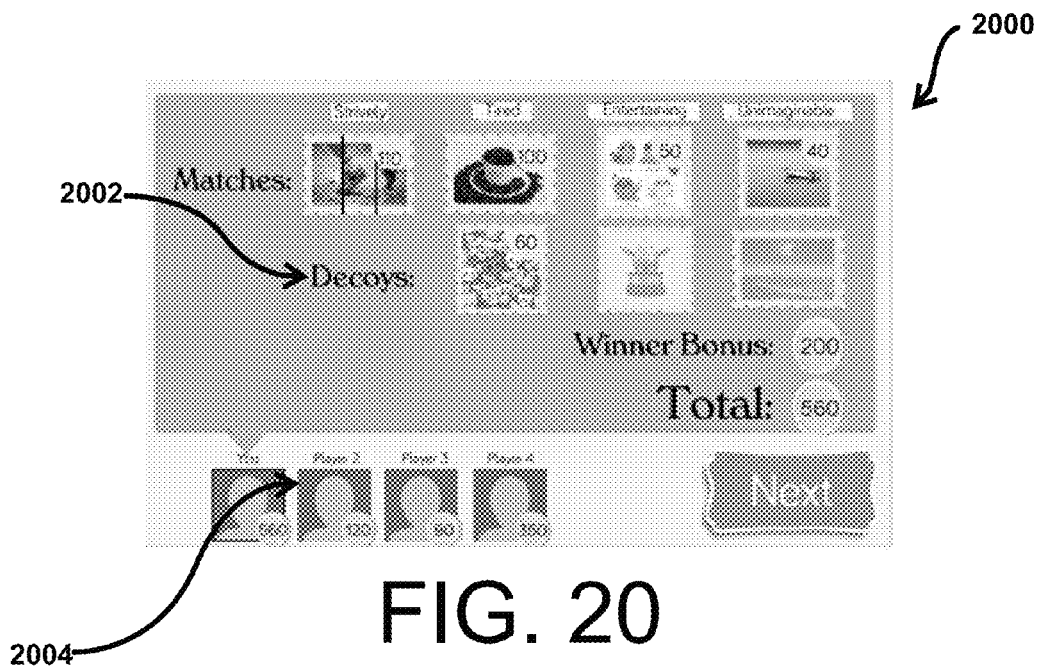
FIG. 20 illustrates an example results screen for an alternative embodiment.

In some embodiments, players may select "decoy" images to associate with other players' descriptors. FIGS. 18-20 show an example of how this game mechanic may be implemented. Screen 1800 of FIG. 18(*a*) is presented to a player after he has selected the descriptor to associate with his original image 640 (FIG. 6(*c*)). On this screen the player is asked to pair the given descriptors 1802, all of which have been chosen by other players to associate with the other players' respective stamp images, with the best decoy images 1804. The player may scroll through the images 1806 to see larger versions. For example, touching or clicking an image may be used to further enlarge the image 1820 (FIG. 18(*b*)). Once the player has decided which images to use, he drags and drops them on to the blank stamp next to each descriptor phrase. In screen 1840 of FIG. 18(*c*), an image has been dragged and dropped on to the phrase "Tired" 1842. By screen 1860 of FIG. 18(*d*), the player has associated all of the given phrases with decoys 1862. In game mode two, if another player chooses one of these decoys to associate with the descriptor phrases assigned to them, the player receives bonus points 1902 (FIG. 19). At the end of each game, on screen 2000 of FIG. 20 players can see the points they received when other players selected their decoys 2002, as well as those netted by other players for theirs 2004. As with his own original image, a player is not permitted to discard the decoys he has chosen in the discarding phase of this embodiment of game mode two in order to ensure that it is still possible for other players to associate them with the phrases with which he has associated them, thus netting him points.

Figure 21A:
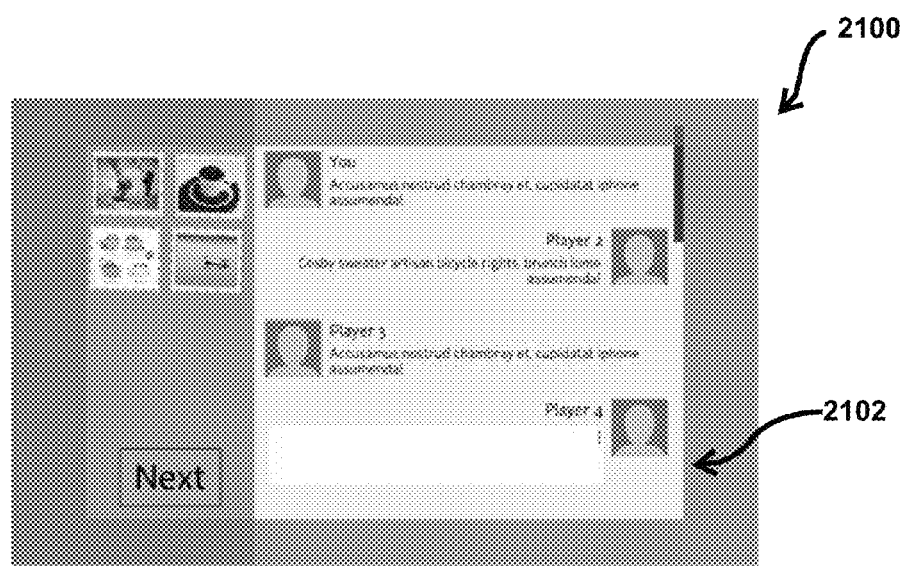
FIG. 21(a) illustrates an example chat interface which displays comments inputted by the game's participants and allows a player to submit comments.
Figure 21B:
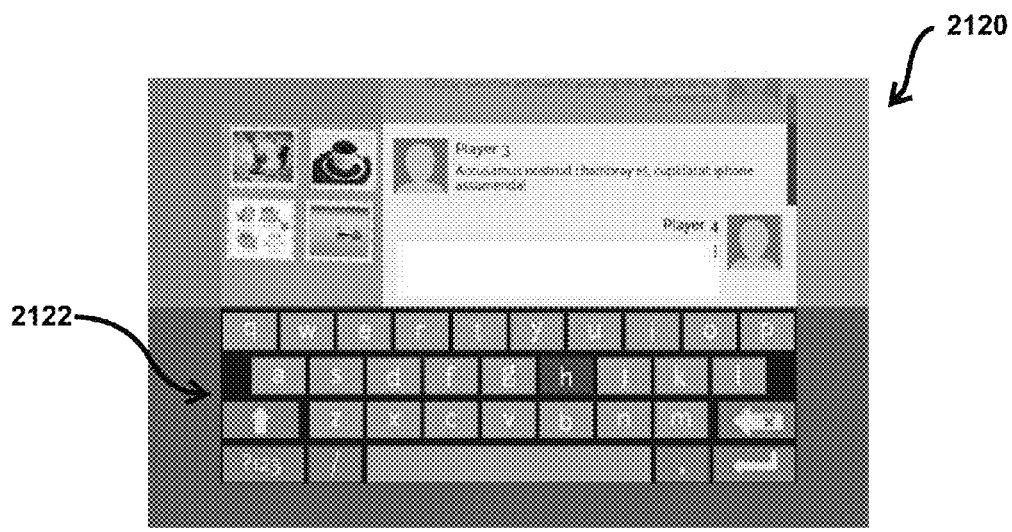
FIG. 21(b) illustrates an example interface for typing comments displayed in real-time in a chat interface.

Some embodiments may include a chat room or discussion forum designed to both foster a sense of community amongst players and elicit player insights on the reasons for their choices. Screen 2100 of FIG. 21(*a*) shows an example chat interface. Players may type messages into the typing bar 2102 using the on-screen keyboard 2122 that are displayed for other players in real-time 2120 (FIG. 21(*b*)).

Figure 22:
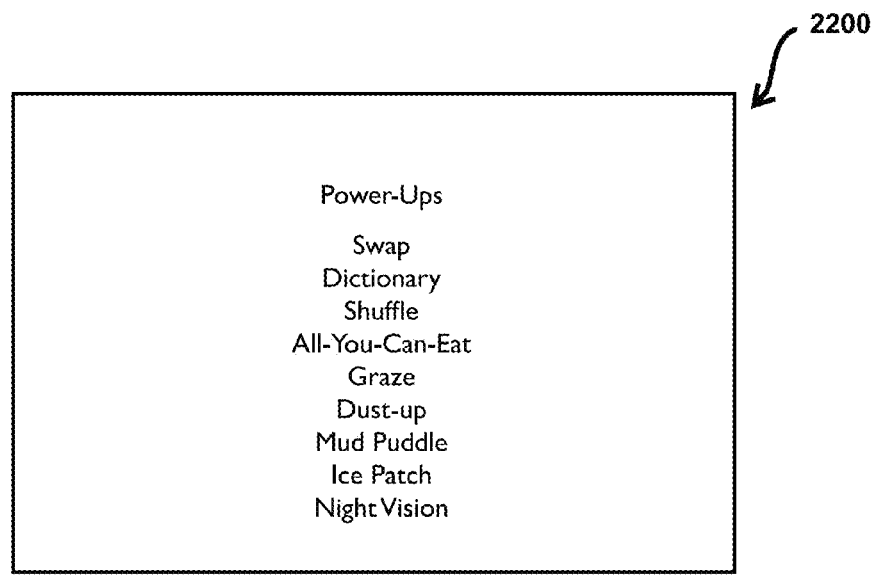
FIG. 22 illustrates example power-up options that can be provided in accordance with various embodiments.

In one embodiment the screen display 2200 in FIG. 22 shows a list of "power-ups" for the "The Stamp Game". Power-ups unlock entertaining game features that can be given to players as rewards or that can be sold to players for virtual or real currency. The power-ups for "The Stamp Game" listed in FIG. 22 are:

Swap: This power-up allows a player to replace the image assigned to him in game mode one with another image.

Dictionary: With this power-up, a player can replace the list of descriptors assigned to him with another list.

Shuffle: This allows a player to replace the set of decoy images assigned to him with another set.

All-You-Can-Eat: When this power-up is selected, players are permitted to guess without incurring any penalties for incorrect guesses for a limited amount of time.

Graze: This power-up reveals the general area of the screen in which an image associated with a given descriptor is located.

Dust-up: This power-up rearranges the images on the other players' game screens, while leaving their positions on the player's own game screen unchanged.

Mud Puddle: This slows the rate at which another player or players can both drag images they have selected and pan the screen to access all images.

Ice Patch: This creates a slippery effect that makes it difficult for another player or players to both drag images they have selected and pan the screen to access all images.

Night Vision: This power-up obscures images for other players, for example by making them dimmer and grayscale.

In other embodiments, the images and descriptor lists presented to players may depend on physical context. For example, certain phrases used as descriptors may be associated with specific geographic locations, e.g. "sneakers" and "tennis shoes" are the preferred terms for athletic shoes in different parts of the United States. The context may even be very local, with different images and descriptor lists used if the players are in different types of buildings, such as a church, workplace, home, hotel, store, restaurant, and the like. The location data used to establish context may be derived from user-supplied data in the player database 300 or by using a geographic location technology such as GPS, IP address, etc.

In one embodiment, the types of images presented to the player may be varied based on interests listed in the user-supplied data in the player database 300, or in response to user input by the players. In another embodiment, the reading level of the descriptors presented to the players may be varied based on user-supplied data in the player database 300, or in response to user input by the players.

The cost of suitable descriptor lists for the images in "The Stamp Game" can represent a significant fraction of the development cost for the entire system. It is therefore advantageous to develop cost-effective means for sourcing them. In one embodiment, one or more novel processes as described herein are used to generate the descriptor lists for images.

In one embodiment, techniques such as crowdsourcing may be used to generate descriptor lists by receiving responses to queries from teams of human contributors, typically via the Internet. For example, lists may be generated by presenting an image combined with a question about said image to a crowdsourcing service such as Amazon's Mechanical Turk® and then retrieving answers. A question like, "What springs to mind when you see this image?" could be sent to several participants in the crowdsourcing system and their answers combined and filtered to improve quality. For example, one player might answer "spring", "silence", and "flowers", while another might respond "flowers", "home", and "walking". By picking only words that are reported multiple times, like "flowers" in this example, the quality and obviousness of the phrases can be improved.

In another embodiment, descriptor lists for "The Stamp Game" may be crowdsourced by having human contributors play a word game. For example, a game like Pictionary® could be used to get contributors to generate lists of phrases that describe the same drawing.

Phrases may also be generated by extraction from on-line and physical documents that contain images. For example, an OCR device may be configured to "read" documents to extract words, or a Web "bot" could be configured to extract words and phrases from documents on the World Wide Web. Reverse image searching, the process of beginning a Web search with an image and searching for pages containing similar images, may be used to generate suitable Web documents.

In another embodiment, words and phrases may be sourced from the metadata associated with images from a stock photo agency such as Getty Images® or Corbis®. Care must be taken to ensure that intellectual property rights are respected when using such images and metadata.

Figure 23:
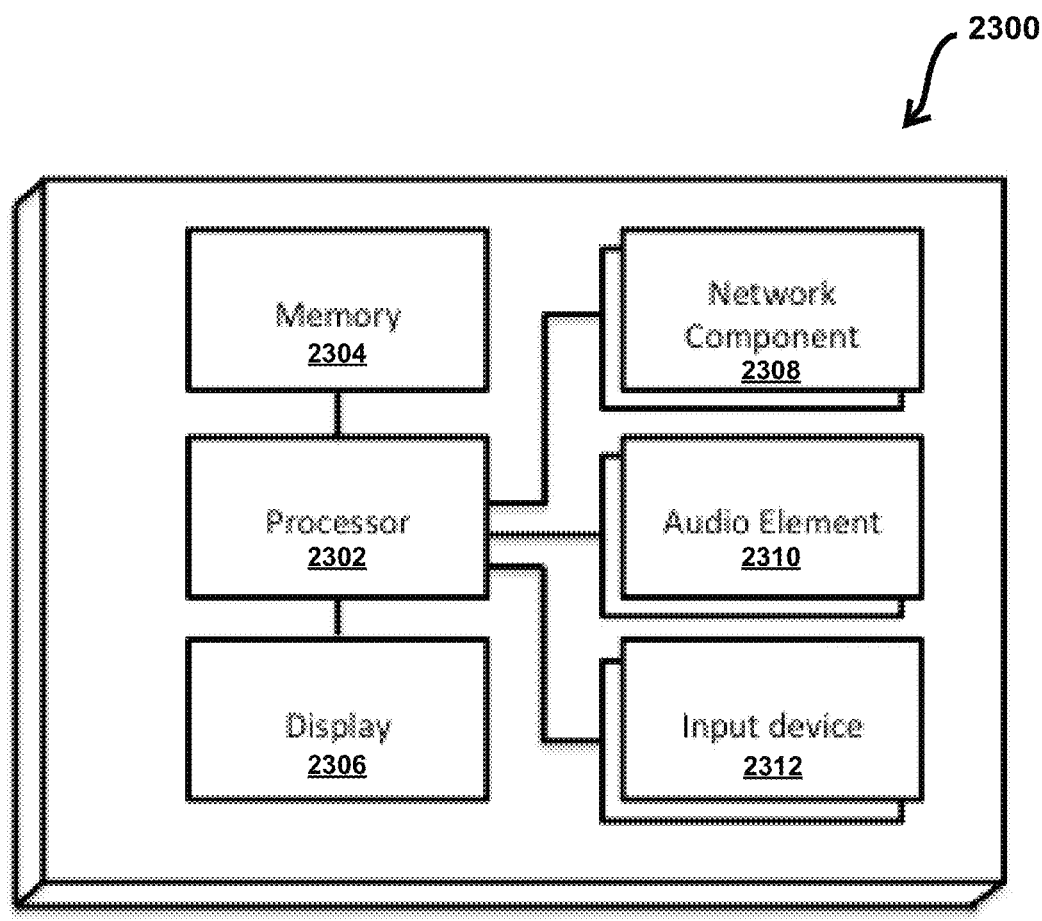
FIG. 23 illustrates example components of a computing device that can be utilized in accordance with various embodiments.

FIG. 23 illustrates a logical arrangement of a set of general components of an example computing device 2300 that is used in the "The Stamp Game" system. In this example, the device includes at least one processor 2302 for executing instructions that can be stored in a memory device or element 2304. As would be apparent to one of ordinary skill in the art, the device can include many types of memory, data storage, or non-transitory computer-readable storage media, such as a first data storage for program instructions for execution by the processor 2302, a separate storage for images or data, a removable memory for sharing information with other devices, etc. The device typically will include some type of display element 2306, such as a touch screen or liquid crystal display (LCD), although devices such as portable media players might convey information via other means, such as through audio speakers. As discussed, the device in many embodiments will include at least one input element 2312 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 2300 of FIG. 23 can include one or more network interface elements 2308 for communicating over various networks, such as a Wi-Fi, Bluetooth, RF, wired, or wireless communication systems. The device in many embodiments can communicate with a network, such as the Internet, and may be able to communicate with other such devices. The example device can include one or more audio elements 2310 as well, such as may include one or more speakers for generating audio output and/or one or more microphones for receiving audio input, such as voice commands from a user.

Figure 24:
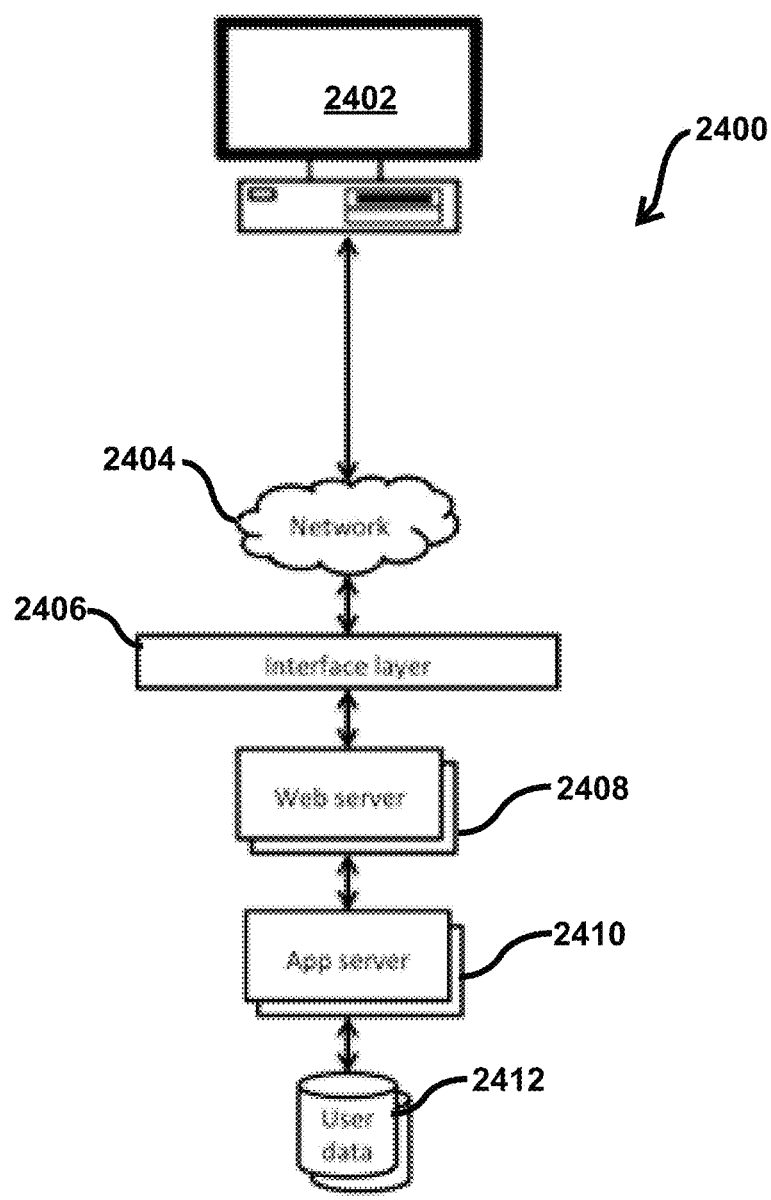
FIG. 24 illustrates an example environment in which various embodiments can be implemented.

FIG. 24 illustrates an example environment 2400 in which various embodiments can be implemented. Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices 2402 used with various embodiments can include any appropriate device operable to send and receive requests, messages, or information over at least one appropriate network 2404 and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

In at least some embodiments, a request from the client device can be received to an interface layer 2406 associated with a destination address of the request, where the interface layer can include components such as routers, load balancers, application programming interfaces, and the like. The interface layer can receive the request and direct information for the request to one or more computing resources, such as one or more Web servers 2408 and/or one or more application servers 2410, which can process the request using data in one or more data stores or databases 2412 in at least some embodiments. It should be understood that there can be several application servers, layers, or other elements, processes, or components, which may be chained or otherwise configured, which can interact to perform tasks as discussed and suggested herein. As used herein a data store refers to any device or combination of devices capable of storing, accessing, and retrieving data, which may include any combination and number of data servers, databases, data storage devices, and data storage media, in any standard, distributed, or clustered environment. A server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 24. Thus, the depictions of various systems and services herein should be taken as being illustrative in nature, and not limiting to the scope of the disclosure.

Various aspects can be implemented as part of at least one service or Web service. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks. Various embodiments utilize at least one network that would be familiar to those skilled in the art for supporting communications using any of a variety of commercially-available protocols, such as TCP/IP. The network can be, for example, a local area network, a wide-area network, a virtual private network, the Internet, an intranet, a cellular network, an extranet, a public switched telephone network, an infrared network, a wireless network, and any combination thereof. Server(s) may be capable of executing programs or scripts in response requests from user devices, such as by executing one or more Web applications that may be implemented as one or more scripts or programs written in any programming language, such as Java® or C++, or any scripting language, such as Perl or Python, as well as combinations thereof. The server(s) may also include any of a number of different database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented system for capturing data via a computer-hosted game operated by a computer system that is connected to a network, the computer-implemented system comprising:
   means for presenting a first image to a player using a video screen, wherein the first image includes information pertaining to an external marketing initiative associated with a product or service being promoted external to the computer-hosted game, and wherein the player is one of a plurality of players each using respective video screens and each being presented with respective images with at least some of the plurality of players separated from other players with communications intermediated over the network;
   means for presenting a first plurality of phrases to the player via the video screen, wherein the first plurality of phrases comprises content configured to elicit a sentiment response from the player about the product or service being promoted;
   means for the player to input, in response to the first plurality of phrases and the first image, a first association between a phrase from the first plurality of phrases and the first image;
   means for storing the first association within a storage location coupled to the computer system;
   means for processing the first association to derive market research data from the player including a sentiment of the player towards the product or service being promoted;
   means for presenting the player with a second plurality of phrases via the video screen and a plurality of other images obtained over the network, wherein the plurality of other images correspond to images presented to others of the plurality of players, and wherein the second plurality of phrases includes phrases selected by the others of the plurality of players pertaining to the external marketing initiative associated with the product or service being promoted;
   means for presenting the player with a countdown clock display;
   means for the player to input a plurality of guesses while the countdown clock display is active, wherein a guess is the player's guess about associations the others of the plurality of players made between the second plurality of phrases and the plurality of other images;
   means for storing the plurality of guesses within the storage location;
   means for timing the player's inputting of the plurality of guesses, with the timing corresponding with the countdown clock display;
   means for scoring the plurality of guesses via the computer system, wherein the scoring depends upon a time period used by the player for inputting the plurality of guesses; and
   means for processing the first association and the plurality of guesses about the associations the others of the plurality of players have made, thereby deriving and validating an association of the market research data from the player including sentiment of the player towards the product or service being promoted with respect to advertising elements associated with the external marketing initiative.

2. The computer-implemented system for capturing data of claim 1, wherein the others of the plurality of players are using a same computer-implemented system as the player.

3. The computer-implemented system for capturing data of claim 1, wherein the means for scoring takes into account a proportion of correct guesses in the plurality of guesses.

4. The computer-implemented system for capturing data of claim 1, wherein the plurality of other images includes at least one distractor image configured to distract the player away from images involved in the associations the others of the plurality of the players made between the second plurality of phrases and the plurality of other images.

5. The computer-implemented system for capturing data of claim 1, further comprising:
   means for retrieving demographic data for the player via the computer system; and
   means for combining the demographic data for the player with the first association to yield the market research data, including the sentiment of the player.

6. A method for capturing data via a computer-hosted game operated by a computer system that is connected to a network, the method comprising:
   presenting a first image to a player using a video screen, wherein the first image includes information pertaining to an external marketing initiative associated with a product or service being promoted external to the computer-hosted game, wherein the player and other players comprise a plurality of players;
   presenting the other players of the plurality of players each with respective images using respective video screens, wherein at least some of other players are separated from the player with communications intermediated over the network;
   presenting a first plurality of phrases to the player via the video screen, wherein the first plurality of phrases comprises content configured to elicit a sentiment response from the player about the product or service being promoted;
   accepting input from the player of a first association between a phrase from the first plurality of phrases and the first image;
   storing the first association within a storage location coupled to the computer system;
   processing the first association to derive market research data from the player including a sentiment of the player towards the product or service being promoted;
   presenting the player with a second plurality of phrases via the video screen, wherein the second plurality of phrases includes phrases selected by the other players pertaining to the external marketing initiative associated with the product or service being promoted;

presenting the player with a plurality of other images obtained over the network, wherein the plurality of other images correspond to images presented to the other players when selecting among the second plurality of phrases;

presenting the player with a countdown clock display signaling a limitation on time allowed for the player making the first association and/or a plurality of guesses, wherein a guess is the player's guess about associations the other players made between the second plurality of phrases and the plurality of other images;

storing the plurality of guesses within the storage location;

timing the player's inputting of the plurality of guesses, with the timing corresponding with the countdown clock display;

scoring the plurality of guesses via the computer system, wherein the scoring depends upon a time period used by the player for inputting the plurality of guesses; and processing the first association and the plurality of guesses about the associations the other players have made, thereby deriving and validating an association of the market research data from the player including sentiment of the player towards the product or service being promoted with respect to advertising elements associated with the external marketing initiative.

7. The method of claim 6, wherein scoring further comprises accounting for correct guesses of the other players as to the first association made by the player.

8. The method of claim 6, wherein scoring further comprises accounting for a number of correct guesses in the plurality of guesses.

9. The method of claim 6, wherein the plurality of other images includes at least one distractor image configured to distract the player away from images involved in the associations the other players made between the second plurality of phrases and the plurality of other images.

10. The method of claim 6, further comprising:
retrieving demographic data for the player via the computer system; and
combining the demographic data for the player with the first association to yield the market research data, including the sentiment of the player.

11. A method for obtaining market research data using a computer-hosted game operated by a computer system that is connected to a network, the method comprising:
initiating the game on one or more computer video screens in response to one or more players requesting to play the game;
receiving a set of game images, wherein at least some of the set of the game images contain advertising elements that are at least partially associated with an external marketing initiative separately promoting a product or service from the game;
receiving a set of sentiment-oriented game phrases, wherein at least some of the set of sentiment-oriented game phrases are associated with sentiment indicators associated with the product or service with respect to the external marketing initiative;
providing to a first player on a first computer video screen a first game image from the set of game images and a subset of the set of sentiment-oriented game phrases;
in response to receiving a selection of a first sentiment-oriented game phrase pertaining to the first game image from the first player from the one or more sentiment-oriented game phrases, retrieving a first sentiment indicator from the sentiment indicators pertaining to the first sentiment-oriented game phrase;
providing to a second player on a second video screen a second game image from the set of images and the subset of the set of sentiment-oriented game phrases;
in response to receiving a selection of a second sentiment-oriented game phrase pertaining to the second game image from the second player from the subset of the set of sentiment-oriented game phrases, retrieving a second sentiment indicator from the sentiment indicators pertaining to the second sentiment-oriented game phrase;
providing the second game image, a plurality of other game images, and the subset of the set of sentiment-oriented game phrases to the first player on the first video screen;
presenting a countdown clock to indicate to the first player a specified time period in which to respond;
processing association inputs received from the first player attempting to match the second player's selection of the second sentiment-oriented game phrase with the second game image; and
in response to receiving from the first player after the specified time period either a match between the second image and the second sentiment-oriented game phrase, or receiving a null input, processing the first sentiment indicator, the second sentiment indicator, and the association inputs received from the first player to determine and validate the association of an overall sentiment value indicative of consumer sentiment toward the product or service with respect to the advertising elements associated with the external marketing initiative.

12. The method of claim 11, further comprising:
providing the first game image, the plurality of other game images, and the subset of the set of sentiment-oriented game phrases to the second player on the second video screen; and
processing association inputs received from the second player attempting to match the first player's selection of the first sentiment-oriented game phrase with the first game image.

13. The method of claim 12, further comprising processing the first sentiment indicator, the second sentiment indicator, and the association inputs from the first player and the association inputs from the second player to determine a sentiment pattern.

14. The method of claim 11, wherein at least some of the set of sentiment-oriented game phrases are configured to indicate a player's level of awareness of the external marketing initiative.

15. The method of claim 14, wherein the level of awareness is weighted according to an elapsed time period taken by a player to select the one or more sentiment-oriented game phrases.

16. The method of claim 11, further comprising selecting the first player and the second player based on matching at least some demographic data pertaining to the first player and the second player.

17. The method of claim 11, wherein the other images includes at least one distractor game image configured to distract the first player away from matching the second player's selection of the second sentiment-oriented game phrase with the second game image.

18. The method of claim 11, further comprising:
sending information about the first player's selection of images to a processor remote from the first player;
sending information about the second player's selection of images to the processor, wherein the processor is remote from the second player; and
aggregating selection information over a plurality of players.

* * * * *

UNITED STATES PATENT AND TRADEMARK OFFICE
CERTIFICATE OF CORRECTION

Page 1 of 1

PATENT NO. : 9,610,495 B2
APPLICATION NO. : 14/250560
DATED : April 4, 2017
INVENTOR(S) : Amber Raschel Aurora Brown It is certified that error appears in the above-identified patent and that said Letters Patent is hereby corrected as shown below:

On the Title Page

Item (73) Assignee, please delete "Upfront Analytics Inc." and insert --Upfront Analytics Ltd.--.

Signed and Sealed this
Seventeenth Day of October, 2017

Joseph Matal
*Performing the Functions and Duties of the
Under Secretary of Commerce for Intellectual Property and
Director of the United States Patent and Trademark Office*